United States Patent [19]
Takada, deceased et al.

[11] 3,995,787
[45] Dec. 7, 1976

[54] AUTOMATIC LOCKING SAFETY BELT RETRACTOR REEL

[75] Inventors: Takezo Takada, deceased, late of Hikone, Japan; by Juichiro Takada, legal authorized heir, Tokyo, Japan

[73] Assignee: Takata Kojyo Co., Ltd., Tokyo, Japan

[22] Filed: Jan. 31, 1975

[21] Appl. No.: 546,161

[30] Foreign Application Priority Data

Feb. 4, 1974 Japan .............................. 49-13628

[52] U.S. Cl. ........................................ 242/107.4 B
[51] Int. Cl.² ........................................ B65H 25/48
[58] Field of Search ............... 242/107.4 B, 107 R, 242/107.4 A; 280/150 SB; 297/388

[56] References Cited
UNITED STATES PATENTS

| | | | |
|---|---|---|---|
| 3,603,525 | 9/1971 | Pringle | 242/107.4 D |
| 3,819,126 | 6/1974 | Stoffel | 242/107.4 A |
| 3,897,024 | 7/1975 | Takada | 242/107.4 B |
| 3,907,227 | 9/1975 | Takada | 242/107.4 B |

*Primary Examiner*—Edward J. McCarthy
*Attorney, Agent, or Firm*—Wolder & Gross

[57] ABSTRACT

An automatic locking safety belt rewind reel includes a U-shaped bracket supporting a shaft to which is affixed a spring rewound reel having a ratchet wheel end plate and a rockable ratchet wheel locking first pawl is spring biased out of engagement with the ratchet wheel. An internally toothed second ratchet wheel rockably mounted on the shaft is coupled to the first pawl. Carried by the shaft within the internal ratchet wheel is an inertia wheel carrying a second pawl and a cam wheel so related that rapid acceleration of the shaft causes a lag in the inertia wheel rotation, actuation of the two pawls and locking of the reel. In order to permit free unwinding of the reel, a frustoconical annular retractor member is axially movable toward and away from the path of a follower on the second pawl to respectively free and restrain the pawl in its disengaged position and the retractor member is spring biased to its retracted position and solenoid actuated to its advanced pawl retracting position.

7 Claims, 1 Drawing Figure

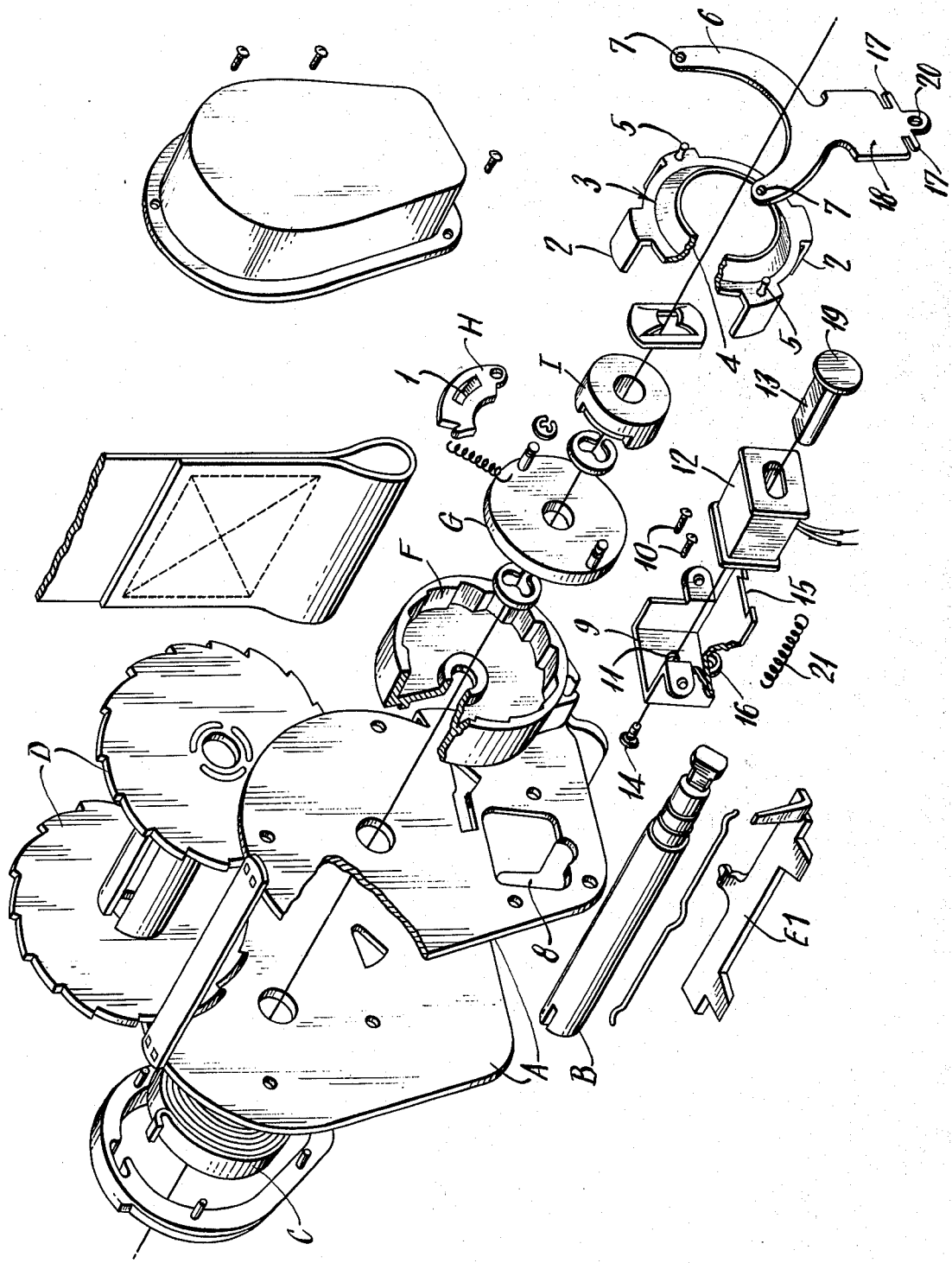

AUTOMATIC LOCKING SAFETY BELT RETRACTOR REEL

BACKGROUND OF THE INVENTION

The present invention relates generally to improvements in vehicle safety belt retractors and it relates more particularly to an improved vehicle safety belt retractor reel mechanism of the type which automatically prevents the extraction of the belt upon the sharp withdrawal of the belt consequent to an abnormal vehicle condition which tends to propel the occupant from the seat.

Many types of safety belt retractor systems are known which normally permit the free movement of a vehicle seat occupant under normal conditions, but automatically lock the retractor against belt withdrawl under abnormal or emergency conditions, which tend to throw the occupant from the seat, such as in the case of a collision or rapid deceleration or vehicle overturning. A well known type of such an automatic locking belt retractor reel which possesses many advantages is of the so called inertia type locking reel in which a sharp acceleration of the belt wind up reel in the belt extraction direction attendent to a sharp withdrawal of the safety belt automatically locks the reel against further belt withdrawal, thereby safely retaining the occupant in the seat and preventing or minimizing injury. However, this inertia type retractor reel possesses an important drawback in that it responds to rapid belt withdrawal whether intentional and desired, or as a result of an emergency. Thus, if the seat occupant does not withdraw the belt for application sufficiently slowly and uniformly, but in a jerky manner, the reel braking mechanism is actuated, preventing adequate belt extraction and requiring a repetition of the belt withdrawal procedure, a practice which is highly inconvenient and annoying, and often results in the seat occupant not applying the safety belt.

SUMMARY OF THE INVENTION

It is a principal object of the present invention to provide an improved vehicle safety belt system.

Another object of the present invention is to provide an improved safety belt retractor.

Still another object of the present invention is to provide an improved inertia type automatic locking vehicle safety belt retractor reel.

A further object of the present invention is to provide an improved inertia locking belt retractor reel which permits the full and rapid withdrawal of the belt attendent to the application thereof.

Another object of the present invention is to provide a device of the above nature characterized by its ruggedness, reliability convenience and ease of use and high versatility and adaptability.

In a sense, the present invention contemplates the provision of an automatic safety belt retractor comprising a belt reel rotatable in opposite belt extraction and retraction directions, spring means urging the reel to rotate in a belt retraction direction, a shaft rotatable with the reel, braking means transferrable between advanced and retracted positions respectively braking and releasing the reel, a ratchet wheel rockable in the shaft between advanced and retracted positions and coupled to the braking means to respectively transfer the braking means to its advanced and retracted positions, an inertia wheel rotatable on the shaft, a pawl member eccentrically swingably mounted on the inertia wheel and movable into and out of engagement with the ratchet wheel and spring urged to a disengage position and having a follower portion, a cam carried by the shaft and engaging the follower portion to advance the pawl member to its engage position in response to the inertia wheel lagging the cam in rotation to advance the ratchet wheel, and characterized in the provision of means for deactuating the pawl comprising an annular deactuator member coaxial with the inertia wheel and movable between an advanced position engaging and retaining the pawl member in its retracted position and a retracted position, releasing the pawl member for movement into engagement with the ratchet wheel.

In the preferred form of the retractor, the braking means includes a ratchet wheel rotatable with the reel and a braking pawl movable into and out of engagement with the ratchet wheel and spring urged to its disengage position. The first ratchet wheel is internally toothed and the inertia wheel is positioned within the ratchet wheel and the retractor member includes fingers projecting longitudinally into sliding engagement with the outer periphery of the first ratchet wheel. The retractor member includes a tapered annular cam surface which is movable into and out of registry with a follower element projecting longitudinally from the first pawl member. A lever is connected to the retractor member and is spring biased to retract the retractor member and includes an armature cooperating with a solenoid so that energization of the solenoid effects the attraction of the armature and the advance of the retractor member.

The improved safety belt retractor is reliable, rugged, versatile and adaptable, and permits the rapid and convenient application of the belt to a seat occupant.

BRIEF DESCRIPTION OF THE DRAWING

The drawing is an exploded perspective view, partially fragmented, of a safety belt retractor embodying the present invention.

DESCRIPTION OF THE PREFERRED EMBODIMENT

Referring now to the drawing which illustrates a preferred embodiment of the present invention, the reference letter A generally designates a U-shaped mounting frame or bracket between and beyond the arms of which is journalled a shaft B which is urged to rotate in a belt winding direction by a suitably mounted and housed spiral spring C. A belt retractor wind-up reel having first ratchet wheel end flanges D is mounted on and rotatable with shaft B. A first pawl member E is rockably supported by frame A for swinging into and out of engagement with ratchet wheels D and is spring urged to its ratchet wheel retracted position and is provided with an actuating finger E1.

An internally toothed second ratchet wheel F is rockably mounted on shaft B externally of the frame A and has an outwardly directed yoke engaging the finger E1 on pawl member E. Rotatably supported by shaft B within second ratchet wheel F is an inertia wheel G which pivotally supports proximate its periphery a pawl H which is swingable between advanced and retracted positions into and out of engagement with ratchet wheel F and is resiliently retracted by a helical tension spring. Formed on the axial outside face of pawl H is an arcuate curved cam element 1. A cam wheel I is mounted on shaft B and includes a peripheral cam surface which engages pawl H so that forward rotation of cam wheel I relative to inertia wheel G causes cam wheel I to advance pawl H into engagement with ratchet wheel F. In the normal operation of the reel thus far explained which has been previously described, a rapid withdrawl of the safety belt from the reel attendent to the rapid deceleration of the associated vehicle causes a rapid acceleration of the rotation of the reel and shaft B, counter-clockwise as viewed in the drawing, thereby resulting in a lag in the rotation of inertia wheel G relative to cam wheel I. The cam wheel I accordingly acts on pawl H to advance it into engagement with ratchet wheel F to rock it counter-clockwise, the ratchet wheel F rocking pawl member E into locking engagement with ratchet wheels D to brake the reel and prevent further withdrawal of the safety belt.

In order to prevent the locking of the reel with the rapid withdrawal of the safety belt attendent to its application, according to the present invention, a mechanism is provided for retaining the pawl H retracted during the period in which the belt is withdrawn for application to the seat occupant. The pawl retractor mechanism comprises a retractor member 3, including a peripherally spaced guide fingers 2 engaging the peripheral face of ratchet wheel F to permit the relative axial movement of the retractor member 3. The fingers 2 are joined by radial legs to an annular section whose inner edge is joined to the outer peripheral edge of a circular frustoconically shaped hollow cam 4 coaxial with shaft B and axially movable into and out of registry with matching cam element 1 in pawl H.

A pair of diametrically opposed longitudinally projecting headed pins are located on retractor member 3 and are engaged by openings 7 formed in the ends of the opposite legs of a shifting yoke 6 to retain the yoke 6 thereto. Depending from the yoke 6 and coplanar and preferrably integral therewith is rectangular armature 18 of a magnetic material, for example, laminated iron sheets, and positioned below and spaced from the bottom edge of armature 18 by horizontal slots, are oppositely projecting laterally extending fingers 17. A lug having an opening 20 depends from and is medially between the ends of fingers 17.

A square opening 8 is formed in the lower free corner of an arm of bracket A proximate ratchet wheel F, and a support bracket 9 registers with opening 8 and includes a rear wall with a central opening 11, a bottom wall projecting through the bottom of opening 8 and side walls provided with laterally projecting ears abutting the inside face of the bracket arm and having tapped bores engaged by mounting screws 10 engaging corresponding openings in the bracket arm bordering opening 8. An apertured lug 16 medially depends from the rear wall of bracket 9. An solenaid 12 rests in the bracket 9 and a core 13 of magnetic material projects through the bore of solenoid 12 and is secured to the rear wall of bracket 9 by a screw 14 passing through opening 11 and engaging a tapped axial bore on the rear of core 13. The front of core 13 is provided with an enlarged head 19 having a flat outer face. The outer edge of the bottom wall of bracket 9 has a dovetail recess 15 formed therein which is engaged by the lateral slots between armature 18 and fingers 17, so that yoke 6 and armature 18 are swingable about the axis of recess 15. The flat front face 19 of electromagnet core 13 closely confronts armature 18 and a helical tension spring having opposite ends engaging lug openings 16 and 20 resiliently urges armature 18 and yoke 6 outwardly to retract retractor member 3, energization of solenoid 12 effecting the advance of solenoid 18, yoke 6 and retractor member 3.

A circuit network, not shown, is provided so that when a passenger occupies a corresponding seat, the solenoid 12 is energized to magnetize core 13 and head 19. Subsequently, when the safety belt buckle is engaged or couple, the circuit network effects the deenergization of solenoid 12, and the demagnetization of core 13 and head 19.

Considering now the operation of the improved inertia locking mechanism described above, the belt is normally not affected by the belt unwinding force, and so, when the solenoid 12 is not energized, the click or pawl H is inwardly retracted by the resilience of the associated spring, so that the internal ratchet wheel F remains inactive and the reel and belt are not locked. Then, when the solenoid 12 is energized by the occupation of the seat, the armature portion 18 of yoke or hanger 6 is attracted to the magnetic core head 19 and the yoke 6 overcomes the attraction of spring 21. As a consequence, the front ends of the legs of the hanger 6 bears leftward, so that the hanger 6 pushes the retractor member 3 leftward in parallel by a weak resilience. The retractor member 3, thus moves leftward along the periphery of internal ratchet wheel F as directed by the circular guides 2, so that the circular cam portion 4 interrupts the unengaged cam element 1 of click or pawl H from being pushed outwardly by the unwinding force of the belt. In this condition, the passenger may rapidly unwind the belt, the emergency locking mechanism not being actuated while the solenoid 12 is energized. Under this condition, the relative rotation of circular cam portion 4 to the unengaged cam 1 is allowed, and the winding and unwinding of the belt can be freely and smoothly effected.

When the solenoid 12 is deenergized, for example, by the engagement of the buckle, the yoke 6 moves the click stopper or retractor member 3 to the right under the influence of the spring 21 so that the circular cam portion 4 is separated from the cam element 1 of click or pawl H, and thus the inertia wheel mechanism starts its pertinent function as an emergency locking device responsive to rapid unwinding of the safety belt to lock the belt reel and stop the belt unwinding.

Employing the improved mechanism described above, a seat occupant may withdraw the belt for application at any speed without actuating the reel brake. However, upon deenergization of the solenoid consequent to the coupling of the buckle, the reel brake is actuated in response to a rapid belt withdrawal due to an emergency or abnormal condition.

While there has been described and illustrated a preferred embodiment of the present invention, it is apparent that numerous alterations, omissions and additions may be made without departing from the spirit thereof.

It is claimed that:

1. An automatic braking safety belt retractor comprising a belt reel rotatable in opposite belt extraction and retraction directions, spring means urging said reel to rotate in a belt retraction direction, a shaft rotatable with said reel, braking means transferrable between advanced and retracted positions respectively braking said reel against belt extraction rotation and releasing said reel, a first ratchet wheel rockable on said shaft between advanced and retracted positions and coupled to said braking means to respectively transfer said braking means to its advanced and retracted positions, an inertia wheel rotatable on said shaft, a first pawl member eccentrically swingably mounted on said inertia wheel and movable to advanced and retracted positions respectively in and out of engagement with said first ratchet wheel and spring urged to a ratchet wheel disengage position, and having a first follower portion, a cam carried by said shaft and engaging said first follower portion to advance said first pawl member to its ratchet engage position in response to said inertia wheel lagging said cam in rotation whereby to advance said ratchet wheel, and characterized in the provision of means for deactuating said first pawl member comprising an annular retractor member coaxial with said inertia wheel and axially movable between an advance position in which said retractor member engages said first pawl member and retains it in its retracted position and a retracted position releasing said first pawl member for movement into engagement with said first ratchet wheel.

2. The belt retractor of claim 1 wherein said braking means comprises a second ratchet wheel rotatable with said reel, a second pawl member movable between brake and release positions respectively engaging and disengaging said second ratchet wheel and spring means urging said second pawl member to its release position.

3. The belt retractor of claim 1 wherein said first ratchet wheel is of annular shape and internally toothed and said inertia wheel is disposed within said first ratchet wheel, said retractor member including peripherally spaced fingers projecting longitudinally into sliding engagement with the outside peripheral face of said first ratchet wheel.

4. The belt retractor of claim 1 wherein said first pawl member includes longitudinally projecting second follower element, said retractor member being axially movable into and out of registry with said second follower element to restrain and release said first pawl member.

5. The belt retractor of claim 1 including spring means urging said retractor member to its retracted position and means for advancing said retractor member.

6. The belt retractor of claim 5 wherein said retractor member advancing means comprises a solenoid and means responsive to the energization and deenergization of said solenoid for advancing and retracting said retractor member.

7. The belt retractor of claim 6 wherein said retractor member advancing and retracting and retracting means comprises a pivoted level engaging said retractor member and an armature positioned on said lever and exposed to and actuated by said solenoid.

* * * * *